United States Patent
Baker et al.

(10) Patent No.: US 7,810,337 B2
(45) Date of Patent: Oct. 12, 2010

(54) METHOD TO RE-ENGAGE START OF DYNAMOELECTRIC MACHINE

(75) Inventors: Donal E Baker, Rockford, IL (US); Gary L. Miles, Stillman Valley, IL (US); Raymond J. Beckmann, Genoa, IL (US)

(73) Assignee: Hamilton Sundtrand Corporation, Windor Locks, CT (US)

( * ) Notice: Subject to any disclaimer, the term of this patent is extended or adjusted under 35 U.S.C. 154(b) by 576 days.

(21) Appl. No.: 11/867,106

(22) Filed: Oct. 4, 2007

(65) Prior Publication Data

US 2009/0091133 A1    Apr. 9, 2009

(51) Int. Cl.
F02C 7/29    (2006.01)
(52) U.S. Cl. .......................................... 60/788; 290/52
(58) Field of Classification Search .................. 60/788; 290/52; 322/37
See application file for complete search history.

(56) References Cited

U.S. PATENT DOCUMENTS 4,093,869 A * 6/1978 Hoffmann et al. ............. 290/31
4,743,777 A * 5/1988 Shilling et al. ................ 290/46
7,034,497 B2 * 4/2006 Markunas et al. ......... 318/400.33
7,288,910 B2 * 10/2007 Dooley .................... 318/400.21
7,334,854 B1 * 2/2008 Chang et al. ............ 318/400.11
7,501,799 B2 * 3/2009 Rozman et al. ................ 322/46

* cited by examiner

Primary Examiner—Michael Cuff
Assistant Examiner—Phutthiwat Wongwian
(74) Attorney, Agent, or Firm—Stephen G. Mican

(57) ABSTRACT

A method of starting a gas turbine engine with a synchronous multiphase alternating current (AC) dynamoelectric machine with a rotor and a stator that allows re-engagement of a starting operation at non-zero rotor speeds comprises the steps of: applying electrical excitation to the rotor; measuring electromotive force (EMF) generated in the stator; determining rotor speed, acceleration and position from the measured EMF by sensorless means; initiating closed-loop sensorless position controlled power to the stator if the determined rotor speed is at least a pre-determined minimum closed-loop sensorless re-engagement speed; initiating open-loop position controlled power to the stator if the determined rotor speed is less than the pre-determined minimum closed-loop sensorless re-engagement speed but at least a predetermined minimum open-loop re-engagement speed and the determined rotor acceleration is no more than a pre-determined maximum open-loop re-engagement acceleration; and initiating open-loop zero-speed start power to the stator if the determined rotor speed is less than the predetermined minimum open-loop re-engagement speed.

12 Claims, 2 Drawing Sheets

METHOD TO RE-ENGAGE START OF DYNAMOELECTRIC MACHINE

FIELD OF THE INVENTION

The invention relates to control systems for dynamoelectric machines, and more particularly to systems for starting dynamoelectric machines.

BACKGROUND OF THE INVENTION

Vehicles such as aircraft may use an alternating current (AC) synchronous dynamoelectric machine as a generator powered by a prime mover, typically a gas turbine engine. Typically, a separate air turbine starter for large engines or a separate dynamoelectric machine for small turbines, usually a direct current (DC) dynamoelectric machine, serves as a starter dynamoelectric machine 6. It is more desirable to use the AC synchronous dynamoelectric machine as both a generator and a starter dynamoelectric machine 6 to eliminate the weight, bulk and mechanical complexity of a separate air turbine or electric starter dynamoelectric machine 6 and associated clutch for disengaging the starter dynamoelectric machine 6 after a start operation. A single AC synchronous dynamoelectric machine may provide savings in weight, space and mechanical complexity compared to separate machines for starter dynamoelectric machine 6 and generator functions in combination with a mechanical clutch mechanism for disengaging the starter dynamoelectric machine 6 after the start operation.

It is essential to know the precise position of a rotor or shaft for a synchronous dynamoelectric machine at all times during a starting process. To enhance reliability and reduce weight it is desirable to have a "sensorless" electric starting system for the dynamoelectric machine. Sensorless starting implies that there is no dedicated angular position or velocity sensor associated with the dynamoelectric machine.

Although there are many different sensorless control algorithms that are suitable for such a sensorless starting system, there presently is no practical sensorless method that works from the maximum normal operating speed all the way down to zero speed. Because starting begins at zero speed, it is necessary to have a work-around for this limitation. In fact, a method that is acceptable, reasonably robust, and most used is a method that relies on slow "open loop" acceleration up to about 10 percent of normal speed. Beyond 10 percent speed system control transfers to a closed loop algorithm that uses the electrical potential and current of the dynamoelectric machine to derive shaft position and velocity. At 10 percent speed and above, there is generally sufficient electromotive force (EMF) available on from the dynamoelectric machine to provide the needed angular position information. Below 10 percent speed, the EMF of the dynamoelectric machine is generally so small that it is difficult to accurately determine angular position even with algorithms that correct for the electrical potential drop across the internal impedance of the dynamoelectric machine.

In the range of zero to 10 percent speed, the difficulty and lack of robustness associated with all sensorless closed loop control algorithms make it almost impossible to adequately determine shaft position whilst simultaneously delivering torque-producing current to the dynamoelectric machine for engine starting. Accordingly, the starting system uses the open loop slow acceleration method for starts beginning at zero speed with a transition to sensorless closed loop control at a sufficiently high speed, such as approximately 10 percent, to assure a continuous and smooth starting torque over the entire starting speed range.

As the name implies, open loop control means that the electrical potential applied to the dynamoelectric machine is independent of rotor position. During open loop control, the starting system controls the applied electrical potential, current and frequency to provide a rotational torque and accelerating speed for the dynamoelectric machine. It is desirable and assumed that the rotor of the dynamoelectric machine follows this applied electrical potential, current and frequency acceleration profile. Typically, a selected acceleration profile must be slow enough to provide adequate torque margin between the maximum available from the dynamoelectric machine (pullout torque) and the load on the dynamoelectric machine due to engine drag and inertial torque. Because the rotor position remains unknown for the open loop operation, only when the acceleration and speed of the rotor are at or close to zero it is generally acceptable to engage the open loop part of the start sequence.

However, there are many instances where it is necessary to restart the dynamoelectric machine at other than zero speed. Examples of such instances that may require "re-engagement" of the starting process between zero speed and closed loop speed are aborted start attempts, engine coasting and engine windmilling, such as occurs with an engine mounted aboard an aircraft. It may be unacceptable to wait a during a pre-determined period that assures that speed has reached zero before beginning an engine start from standstill, especially when the engine is needed for emergency situations or for safe operations. Because re-engagement may be required for any speed between zero speed and cut out speed of the dynamoelectric machine in its starting mode, it is essential to provide that function for sensorless starters including open loop speeds where the sensorless algorithm is not functional.

SUMMARY OF THE INVENTION

The invention generally comprises a method of starting a gas turbine engine with a synchronous multiphase alternating current (AC) dynamoelectric machine with a rotor and a stator that allows re-engagement of a starting operation at non-zero rotor speeds, comprising the steps of: applying electrical excitation to the rotor; measuring electromotive force (EMF) generated in the stator; determining rotor speed, acceleration and position from the measured EMF by sensorless means; initiating closed-loop sensorless position controlled power to the stator if the determined rotor speed is at least a pre-determined minimum closed-loop sensorless re-engagement speed; initiating open-loop position controlled power to the stator if the determined rotor speed is less than the pre-determined minimum closed-loop sensorless re-engagement speed but at least a predetermined minimum open-loop re-engagement speed and the determined rotor acceleration is no more than a pre-determined maximum open-loop re-engagement acceleration; and initiating open-loop zero-speed start power to the stator if the determined rotor speed is less than the predetermined minimum open-loop re-engagement speed.

DETAILED DESCRIPTION OF THE INVENTION

Figure 1:
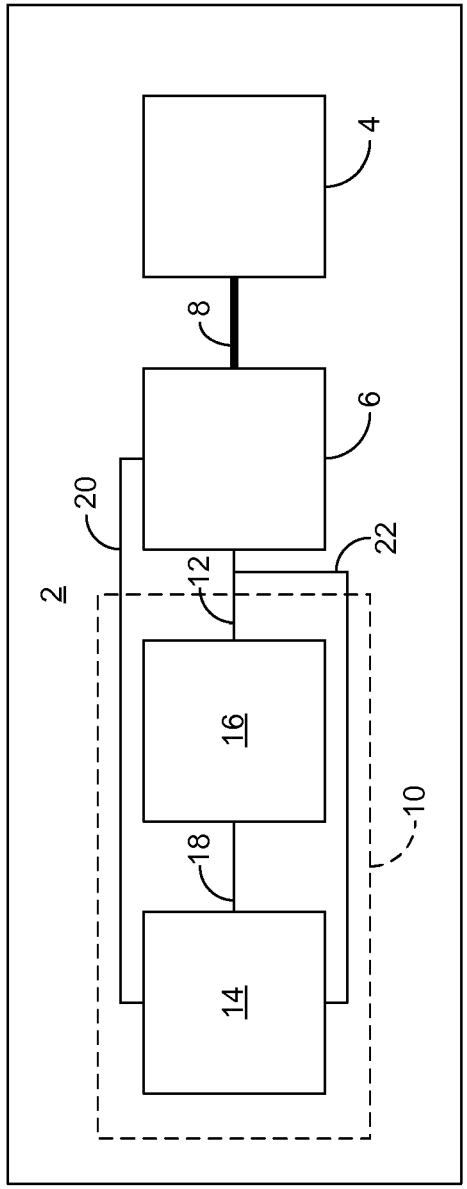
FIG. 1 is a high-level schematic diagram of a gas turbine engine system that is configurable for a possible embodiment of the invention.

FIG. 1 is a high-level schematic diagram of a gas turbine engine system 2 that is configurable for a possible embodiment of the invention. A gas turbine engine 4 couples to a synchronous multiphase AC dynamoelectric machine 6 by means of a mechanical coupling 8, such as a drive shaft or gearbox. A multiphase AC starting system 10 supplies controlled multiphase AC power to the dynamoelectric machine 6 by way of a multiphase AC power bus 12. The multiphase AC is typically three-phase AC. The starting system 10 comprises a system control unit 14 that controls a multiphase AC inverter 16 by way of a control bus 18 and applies multiphase AC rotor excitation current to a rotor in the dynamoelectric machine by way of an exciter current bus 20 in response to EMF that it measures across the dynamoelectric machine by way of a control loop bus 22. The inverter 16 supplies the controlled AC power to the dynamoelectric machine 6 by way of the AC power bus 12.

Figure 2:
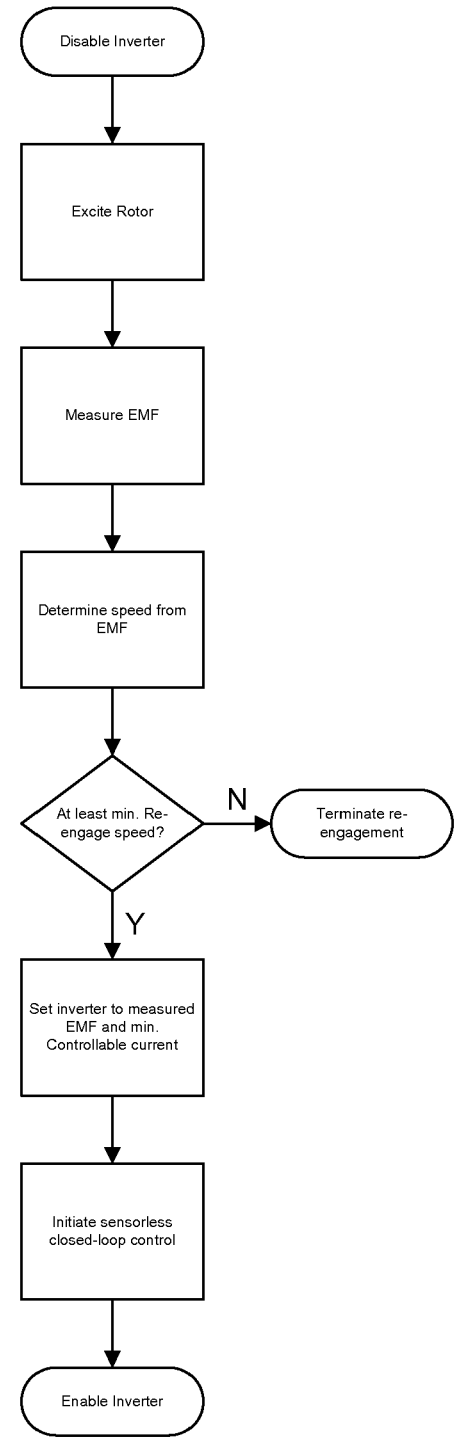
FIG. 2 is a flow chart that represents a gas turbine engine starting process according to the prior art.

FIG. 2 is a flow chart that represents a gas turbine engine starting process for the starting system 10 according to the prior art. Starting with the inverter 16 disabled, the first step of the starting process comprises the system control unit 14 applying excitation to a rotor of the dynamoelectric machine 6. The next step comprises the system control unit 14 measuring the EMF generated in a stator of the dynamoelectric machine 6 by way of the control loop bus 22. The next step comprises the system control unit 14 determining the rotor speed from the measured EMF. The next step comprises the system control unit 14 comparing the measured rotor speed to a pre-determined minimum re-engagement speed, such as 10 percent of normal maximum speed of the dynamoelectric machine 6. If the speed is less than the pre-determined minimum re-engagement speed, no re-engagement occurs and the starting process ends. If the speed is at least the minimum pre-determined re-engagement speed, the starting process continues.

The next step of the starting process comprises the system control unit 14 generating control signals on the control bus 18 that set the inverter 16 to generate AC power on the AC power bus 12 with a level of potential equal to the measured EMF potential of the dynamoelectric machine 6 and a level of current equal to a pre-determined minimum controllable current. The next step of the starting process comprises the system control unit 14 initiating sensorless position control of the dynamoelectric machine 6. The final step of the starting process comprises the system control unit 14 generating control signals on the control bus 18 that enable the inverter 16.

For speeds below 10 percent of normal maximum speed of the dynamoelectric machine 6 the difficulty with re-engagement comprises certainty that the dynamoelectric machine 6 does not cause the starting system 10 to fail or otherwise become inoperative when it connects to the starting system 10. Rotor position information of the dynamoelectric machine 6 at this time is vital. Without it, the phase angle error between the controlled AC electrical potential delivered by the starting system 10 on the AC power bus 12 and the electrical potential across the dynamoelectric machine 6 could be large enough and of proper polarity to cause the power to flow in the wrong direction and potentially damage the starting system 10 and eliminate any further engine start capability. In addition, if there is no proper alignment achieved in an open loop re-engagement, the resulting torque transient may be sufficiently high that it will cause the dynamoelectric machine 6 to over or under accelerate with such power that it will cause loss of synchronism and loss of torque.

The closed loop sensorless algorithms use the applied dynamoelectric machine 6 electrical potential and the current drawn by the dynamoelectric machine 6 to determine the starter rotor position whilst simultaneously delivering torque to crank the engine, for speeds between approximately 10 and 100 percent of normal maximum or cut out speed for the dynamoelectric machine 6. For speeds within this closed loop operational speed range, re-engagement can safely utilise the sensorless algorithm as it was developed and intended.

For speeds below 10 percent of maximum normal or cut out speed, the sensorless algorithm cannot function in a closed loop mode and cannot provide reliable torque. However, the sensorless algorithm can readily provide rotor angular information for speeds below 10 percent of cut out speed when no torque current is present on the dynamoelectric machine 6. Under this condition, the signal to noise ratio is extremely good and the very small EMF provided by the dynamoelectric machine 6 at these low speeds is more than sufficient to for the sensorless algorithm to provide accurate rotor angular information. That is, without using the sensorless algorithm in a closed loop fashion with currents of the dynamoelectric machine 6 effectively at zero it is possible to extract useful angular position, speed, and acceleration information from the sensorless algorithm in a continuous real time fashion. Accuracy of this angular information, even for dynamic acceleration or deceleration conditions, is more than sufficient for speeds down to approximately 0.5 percent of cut out speed, about 20 times better than when the sensorless algorithm is in closed loop operation whilst torque currents on the AC power bus 12 drive the dynamoelectric machine 6.

With real time dynamic angular information available whilst the starter is disengaged and coasting in the open loop speed range, it is possible to instantly initialise the dynamoelectric machine 6 drive inverter with the correct information needed to match the phase angle, electrical potential amplitude, velocity and acceleration of the dynamoelectric machine 6 with the inverter 16 sufficiently well to connect the dynamoelectric machine 6 and the inverter 16 together. With this ability to match parameters at the instant of connection there will be no unwanted current flow or torque impulse that might damage the starting system 10 or cause loss of phaselock between dynamoelectric machine 6 and starting system 10. Immediately after the connection of the dynamoelectric machine 6 the starting system 10 can resume the normal acceleration of the dynamoelectric machine 6 using the existing open loop algorithm until the dynamoelectric machine 6 reaches approximately 10 percent speed. At that point the transition to the closed loop sensorless algorithm will assure continuous and smooth torque delivery to complete the start cycle.

In this manner, the existing open loop acceleration algorithm and closed loop sensorless acceleration algorithm are usable for non-zero speed re-engagement of the starting process for the dynamoelectric machine 6. The starting process needs no additional hardware since control software in the system control unit 14 may accomplish this task.

Figure 3:
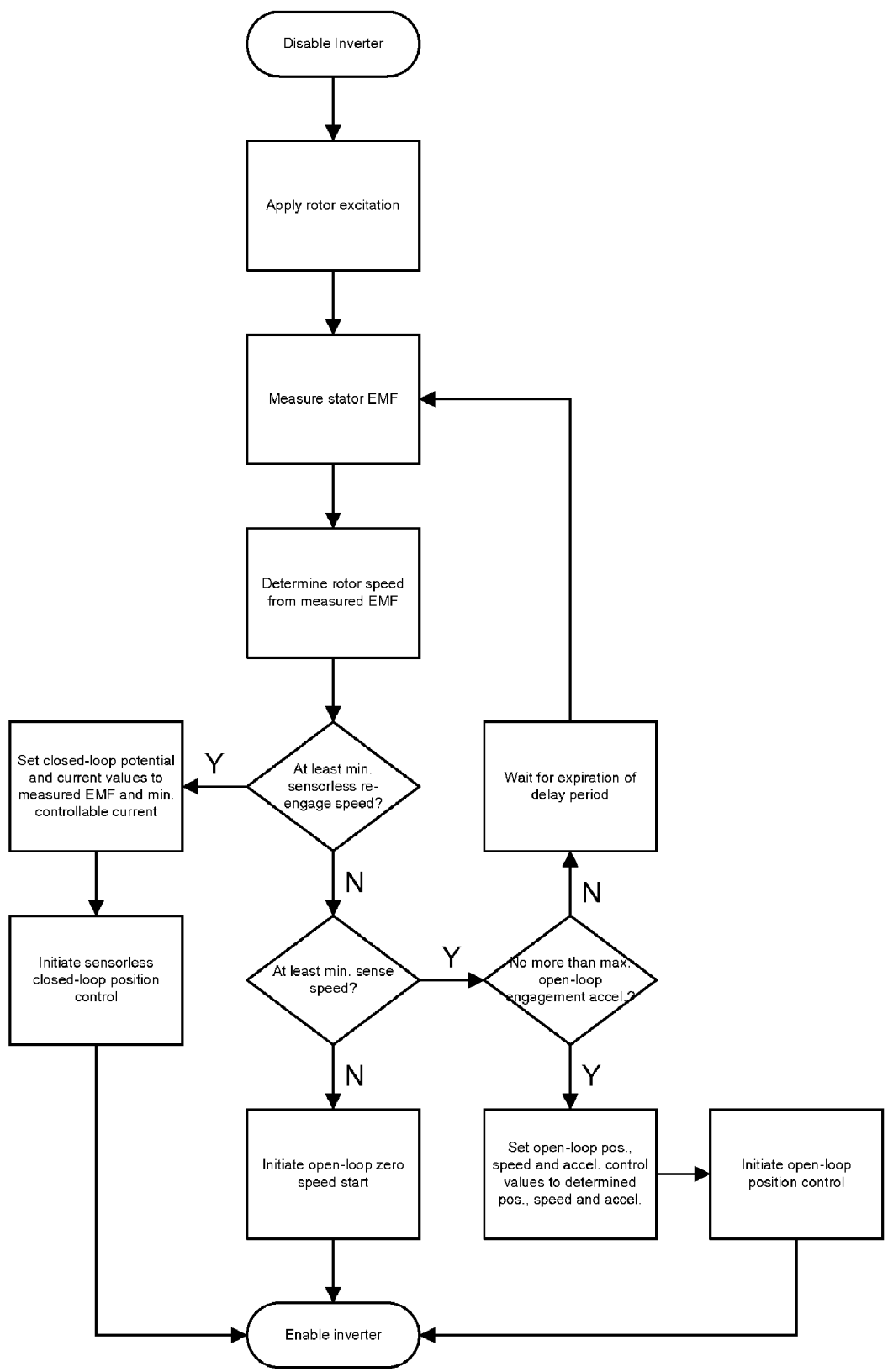
FIG. 3 is a flow chart that represents a gas turbine engine starting process according to a possible embodiment of the invention.

FIG. 3 is a flow chart that represents a gas turbine engine starting process according to a possible embodiment of the invention. Starting with the inverter 16 disabled, the first step of the starting process comprises the system control unit 14 applying excitation to a rotor of the dynamoelectric machine 6 by way of the exciter current bus 20. The next step of the starting process comprises the system control unit 14 measuring the EMF generated in a stator of the dynamoelectric machine 6 by way of the control loop bus 22. The next step of the starting process comprises the system control unit 14 determining the speed, acceleration and position of the rotor from the measured EMF by means of a sensorless algorithm. The next step of the starting process comprises the system control unit 14 comparing the measured speed to a pre-determined speed known large enough to sustain sensorless closed-loop position control, which speed may correspond to approximately 10 percent of normal maximum speed of the dynamoelectric machine 6. If the measured speed is at least the pre-determined minimum speed to sustain sensorless closed-loop position control, the system control unit 14 generates control signals on the control bus 18 that set the inverter 16 to generate AC power on the AC power bus 12 with a level of potential equal to the measured EMF potential of the dynamoelectric machine 6 and a level of current equal to a pre-determined minimum controllable current, it initiates sensorless closed-loop position control and it generates control signals on the control bus 18 that enables the inverter 16.

If the determined rotor speed is less than the minimum pre-determined speed necessary to sustain sensorless closed-loop position control, the system control unit 14 compares the determined rotor speed with a pre-determined minimum re-engagement speed necessary for open-loop operation, typically about 0.5 percent of the maximum normal or cut out speed of the dynamoelectric machine 6. If the speed is less than the pre-determined minimum open-loop re-engagement speed, the system control unit 14 initiates a zero-speed open-loop starting operation and generates control signals on the control bus 18 that enables the inverter 16. If the determined speed is at least the minimum open-loop re-engagement speed, the system control unit 14 compares the measured rotor acceleration with a pre-determined maximum open-loop re-engagement level of acceleration. If the acceleration is greater than the pre-determined maximum open-loop re-engagement acceleration, such as due to engine windmilling, the system control unit 14 waits for the expiration of a pre-determined delay period for the rotor to de-accelerate, such as at least two seconds, and then it re-measures the EMF generated in the stator of the dynamoelectric machine 6 by way of the control loop bus 22 to begin the starting process again. If the determined acceleration is no more than the pre-determined maximum acceleration, the system control unit 14 generates control signals on the control bus 18 that set the inverter 16 to the determined position, speed and acceleration values, it initiates open-loop position control and it generates control signals on the control bus that enables the inverter 16.

The described embodiments of the invention are only some illustrative implementations of the invention wherein changes and substitutions of the various parts and arrangement thereof are within the scope of the invention as set forth in the attached claims.

The claimed invention is:

1. A method of starting a gas turbine engine with a synchronous multiphase alternating current (AC) dynamoelectric machine with a rotor and a stator that allows re-engagement of a starting operation at non-zero rotor speeds, comprising the steps of:
    applying electrical excitation to the rotor;
    measuring electromotive force (EMF) generated in the stator;
    determining rotor speed, acceleration and position from the measured EMF by sensorless means;
    initiating closed-loop sensorless position controlled power to the stator if the determined rotor speed is at least a pre-determined minimum closed-loop sensorless re-engagement speed;
    initiating open-loop position controlled power to the stator if the determined rotor speed is less than the pre-determined minimum closed-loop sensorless re-engagement speed but at least a predetermined minimum open-loop re-engagement speed and the determined rotor acceleration is no more than a pre-determined maximum open-loop re-engagement acceleration; and
    initiating open-loop zero-speed start power to the stator if the determined rotor speed is less than the predetermined minimum open-loop re-engagement speed.

2. The method of claim 1, wherein the step of initiating closed-loop sensorless position controlled power to the stator further comprises the step of setting the power to an electrical potential level that corresponds to the measured EMF and a current level that corresponds to a pre-determined minimum controllable current.

3. The method of claim 1, wherein the step of initiating open-loop position controlled power to the stator further comprises the step of setting the power with phase, potential and current levels to match the determined rotor speed, acceleration and position.

4. The method of claim 1, further comprising the step of waiting for the expiration of a pre-determined delay period when the determined speed of the rotor is at least the predetermined minimum open-loop re-engagement speed and the determined rotor acceleration is more than the pre-determined maximum open-loop re-engagement acceleration.

5. The method of claim 4, further comprising the step of re-measuring EMF generated in the stator after the expiration of the pre-determined delay period to begin the starting process again.

6. A method of starting a gas turbine engine with a synchronous multiphase alternating current (AC) dynamoelectric machine with a rotor and a stator that allows re-engagement of a starting operation at non-zero rotor speeds, comprising the steps of:
    applying electrical excitation to the rotor;
    measuring electromotive force (EMF) generated in the stator;
    determining rotor speed, acceleration and position from the measured EMF by sensorless means;
    initiating closed-loop sensorless position controlled power to the stator with an electrical potential level that corresponds to the measured EMF and a current level that corresponds to a pre-determined minimum controllable current if the determined rotor speed is at least a pre-determined minimum closed-loop sensorless re-engagement speed;
    initiating open-loop position controlled power to the stator with phase, potential and current levels to match the determined rotor speed, acceleration and position if the determined rotor speed is less than the pre-determined minimum closed-loop sensorless re-engagement speed but at least a predetermined minimum open-loop re-engagement speed and the determined rotor acceleration is no more than a pre-determined maximum open-loop re-engagement acceleration;
    initiating open-loop zero-speed start power to the stator if the determined rotor speed is less than the predetermined minimum open-loop re-engagement speed; and
    waiting for the expiration of a pre-determined delay period when the determined speed of the rotor is at least the predetermined minimum open-loop re-engagement speed and the determined rotor acceleration is more than the pre-determined maximum open-loop re-engagement acceleration.

7. The method of claim 6, further comprising the step of re-measuring EMF generated in the stator after the expiration of the pre-determined delay period to begin the starting process again.

8. A starting system for a gas turbine engine that allows re-engagement of a starting operation at non-zero engine speeds, comprising:
- a synchronous multiphase alternating current (AC) dynamoelectric machine with a rotor and a stator couples to the gas turbine engine;
- a multiphase (AC) inverter system that supplies controlled power to the stator; and a system control unit that senses electromotive force EMF generated in the stator and controls the power that the inverter supplies to the stator;
- wherein the system control unit:
- applies electrical excitation to the rotor;
- measures electromotive force (EMF) generated in the stator;
- determines rotor speed, acceleration and position from the measured EMF by sensorless means;
- controls the inverter to supply closed-loop sensorless position controlled power to the stator if the determined rotor speed is at least a pre-determined minimum closed-loop sensorless re-engagement speed;
- controls the inverter to supply open-loop position controlled power to the stator if the determined rotor speed is less than the pre-determined minimum closed-loop sensorless re-engagement speed but at least a predetermined minimum open-loop re-engagement speed and the determined rotor acceleration is no more than a pre-determined maximum open-loop re-engagement acceleration; and
- controls the inverter to supply open-loop zero-speed start power to the stator if the determined rotor speed is less than the predetermined minimum open-loop re-engagement speed.

9. The starting system of claim 8, wherein when the system control unit controls the inverter to supply closed-loop sensorless position controlled power to the stator it controls the inverter to supply the power to an electrical potential level that corresponds to the measured EMF and a current level that corresponds to a pre-determined minimum controllable current.

10. The starting system of claim 8, wherein when the system control unit controls the inverter to supply open-loop position controlled power to the stator further it controls the inverter to supply the power with phase, potential and current levels to match the determined rotor speed, acceleration and position.

11. The starting system of claim 8, wherein the system control unit waits for the expiration of a pre-determined delay period when the determined speed of the rotor is at least the predetermined minimum open-loop re-engagement speed and the determined rotor acceleration is more than the pre-determined maximum open-loop re-engagement acceleration.

12. The starting system of claim 11, wherein the system control unit re-measures EMF generated in the stator after the expiration of a pre-determined delay period to begin the starting process again.

* * * * *